Feb. 17, 1970 C. E. HENDRIX 3,496,382

LEARNING COMPUTER ELEMENT

Filed May 12, 1967 2 Sheets-Sheet 1

INVENTOR.
Charles E. Hendrix
BY John E. Wagner

INVENTOR.
Charles E. Hendrix
BY John E. Wagner

United States Patent Office 3,496,382
Patented Feb. 17, 1970

3,496,382

LEARNING COMPUTER ELEMENT

Charles E. Hendrix, Glendora, Calif., assignor to Aerojet-General Corporation, El Monte, Calif., a corporation of Ohio Filed May 12, 1967, Ser. No. 638,141
Int. Cl. H03k *19/08, 19/12*
U.S. Cl. 307—201 3 Claims

ABSTRACT OF THE DISCLOSURE

This invention relates to adaptive computer technology and more particularly to electronic circuitry for simulating neural functions. I have developed an electronic circuit capable of simulating all of the significant functional properties of neurons.

BACKGROUND OF THE INVENTION

Field of the invention

The development of mathematical or physical models of neurons serve dual purposes of increasing our understanding of neural action and to produce a generation of computing devices having the adaptive or learning capability of neurons.

Description of the prior art

One principal characteristic of the neuron is the property of axon discharge which allows the conduction of impulses over a distance. This capability has been simulated in the electrochemical systems disclosed in the R. M. Stewart Patents 3,149,310 and 3,295,112 assigned to the assignee of this invention, or more simply by a copper conductor. Functional properties of the neuron more difficult to simulate are:

(a) The neuron responds to a stimulus with an electrical pulse of standard size and shape. If the stimulus continues, the pulses occur at regular intervals with the rate of occurrence dependent on the intensity of stimulation.

(b) There is a threshold of stimulation. If the intensity of the stimulus is below this threshold, the neuron does not fire.

(c) The neuron is capable of temporal and spartial integration. Many sub-threshold stimuli arriving at the neuron from diferent sources, or at slightly different times, can add up to a sufficient level to fire the neuron.

(d) Some inputs are excitatory, some are inhibitory.

(e) There is a refractory period. Once fired, there is a subsequent period during which the neuron cannot be fired again, no matter how large the stimulus. This places an upper limit on the pulse rate of any particular neuron.

(f) The neuron can learn. This property is conjectural in living neurons, since it appears that at the present time learning has not been clearly demonstrated in isolated living neurons. However, the learning property is basic to all self-organizing models.

Neuron models with the above characteristics have been built, although none seem to have incorporated all of them in a single model. Harmon et al. have built neuron models which have the characteristics (a) through (e), with which he has built extremely interesting devices which simulate portions of the peripheral neuron system. These are reported in Harmon, L. D., Levinson, J., and Van Bergeijk,. W.A.. "Analog Models of Neural Mechanism, "IRE Trans. On Information Theory IT–8:107–112 (February 1962).

Various attempts at learning elements have been made, perhaps best exemplified by those of Widrow, B., and Hoff, M.E., "Adaptive Switching Circuits," Stanford Electronics Lab Tech Report 1553–1, June 1960. These devices are capable of "learning," but are static, and lack all the temporal characteristics listed in (a) through (e). Such devices can be used to deal with temporal patterns only by a mapping technique, in which a temporal pattern is converted to a spatial one.

Having listed which seem to be the important properties of a neuron, it is possible to synthesize a simple model which has all of them.

SUMMARY OF THE INVENTION

Basically, the invention involves a discrete electronic circuit having a number of input terminals which are combined in a summing network and constituting the triggering input to monostable multivibrator. This circuit provides simulation of the five characteristics (a)–(e) above. The adaptive or learning function ((f) above) is provided when the circuit includes an outside input which determines whether the last response of the circuit was desirable or not. If it was desirable, the response threshold is lowered, making it easier to respond the next time. If the result was not desirable, the threshold is raised, making it more difficult for the neuron to fire the next time. Electronically, this is accomplished by routing the output of the monostable multivibrator through a short-term memory device. This memory which may merely be a pulse stretcher circuit, temporarily records the fact that the neuron has recently fired. This short-term memory controls a gate which either accepts or rejects an external control (punish-reward) signal used to control a variable resistor in the summing circuit.

This combination contains, in a relatively simple electronic circuit, the necessary properties to react like a neuron to external stimuli. When a number of these circuits are connected in a net, the circuits are likewise able to exhibit the properties of neural nets.

BRIEF DESCRIPTION OF THE DRAWING

This invention and its features may be more clearly understood from the following description and by reference to the drawing in which.

DESCRIPTION OF THE PREFERRED EMBODIMENTS

Figure 1:
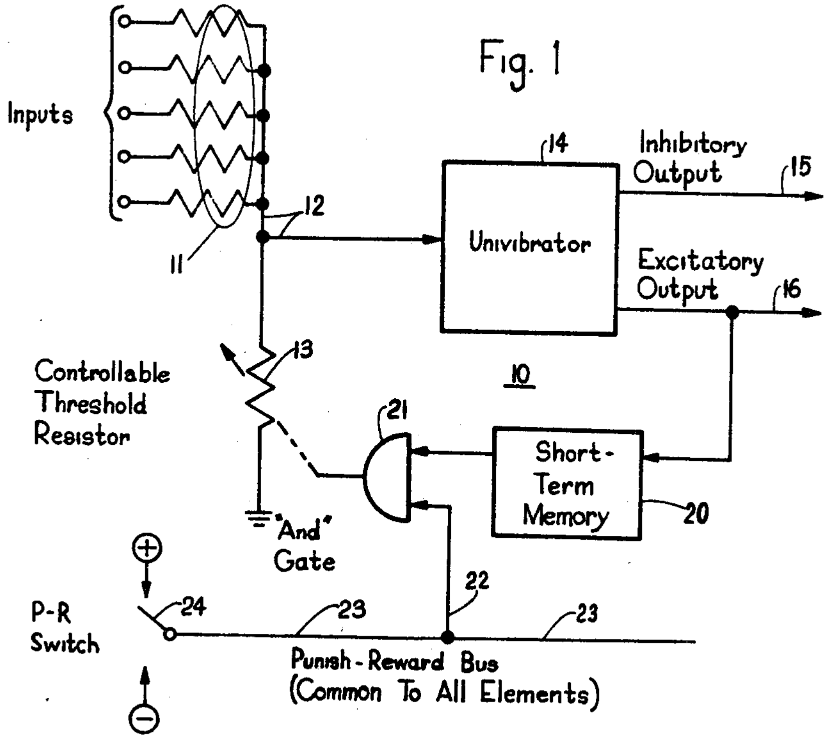
FIG. 1 is a block diagram of this invention.

Now referring to the drawing, in FIG. 1, a single computer element 10 or artificial neuron is shown comprising a plurality of input terminals connected through respective isolating input resistors 11 to a common input line 12 used for summing the incoming signal. The total current flows through the threshold resistor 13, and the voltage appearing on the input line 12 is the product of the sum of the input currents and the value of the threshold resistor.

The input line 12 constitutes the trigger signal source for a monostable multivibrator or univibrator 14. This later has a pair of output leads 15 and 16, one an inhibitory output and the second an excitatory output. The output leads may either produce opposite polarity pulses or may provide their function by their mode of connection to the succeeding stage or utilization device. Where computer units 10 are connected in a net or series similar to FIG. 2 below, the output leads 15 and 16 would normally be of opposite polarity as can easily be derived from opposite switching elements in the conventional univibrator 14.

The excitatory output 16 is additionally connected to a short term memory device or pulse stretcher 20 which serves as an enabling input to a coincidence or AND gate 21. The second input to AND gate 21 is over lead 22 from a common bus 23 under control of an external switch 24, here designated as the punish-reward switch. The switch 24 is used to apply a signal through the AND gate 21 to the variable resistance 13 associated with the summing network 12.

In operation, the computer element of this invention is connected with each of its *n* number of inputs connected to information sources. The sources may provide signals, either analog or discrete level, simultaneous, timed or random. In any case, the signals are summed and applied to the switching input of the univibrator 14. The signal level of lead 12 at the univibrator 14 control input is a function of the summation of all inputs 10 and the resistance R of controllable threshold resistance 13. If this summation exceeds the switching threshold of univibrator 14, it will operate and produce an output pulse on lead 16 indicative of a positive response. At the same time, an output pulse for example, the excitatory pulse, is temporarily stored in memory 20 and during the storage period AND gate is enabled for transmission of a P-R signal to modify the resistance R of element 13. If a P-R signal indicative of a favorable response (reward) is applied to lead 23 to adjust the threshold of resistor 13, it allows easier triggering of the univibrator 14. Conversely if the punish switch is operated during the enablement period, the threshold is adjusted in an opposite sense. If no P-R switch input occurs during the enablement period, the threshold remains unchanged.

As just described, the computer element 10 exhibits all of the neutral properties catalogued above, and in particular is adaptive or capable of learning, owing to the presence of the memory 20, AND gate 21 and variable threshold resistance 13.

Figure 2:
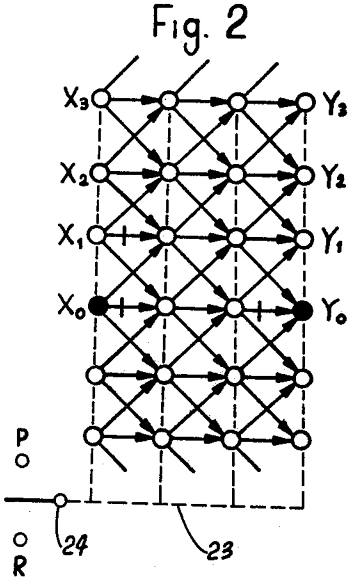
FIG. 2 is a schematic representation of a portion of a net employing the circuit of FIG. 1.
Figure 3:
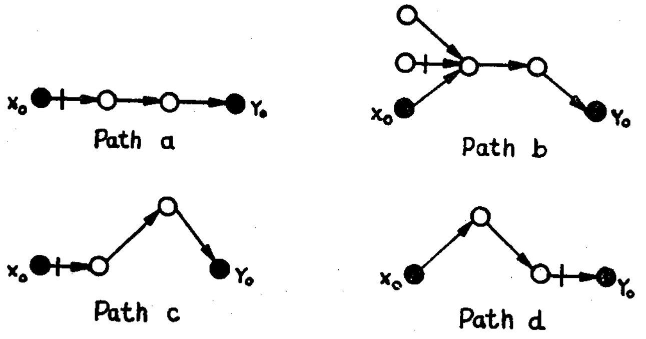
FIG. 3 constitutes three fragmentary portions of the net of FIG. 2 illustrating alternate signal paths through the net of FIG. 2; and, FIG. 4 is an electrical schematic diagram of a circuit meeting the characteristics of FIG. 1.

When a number of similar elements 10 are connected into a net as illustrated in FIG. 2, the elements can form a logically complete system. This is accomplished if some form of negation is included. Negation can be provided where opposite polarity pulses or signals are applied to indicate excitatory or inhibitory information and opposite polarity output from each element 10 are used as the respective inhibitory excitator inputs to subsequent stages. This arrangement is illustrated in FIG. 2 where a discrete input element 10 is represented as X and a corresponding output element 10 is designated as Y. In the small fragment of a net shown, a plurality of signal conduction paths exist between elements X and Y. Four of such paths are illustrated in FIG. 3. Adding the mirror image paths to B, C and D gives a total of seven signal paths between X and Y where only excitatory signals emanate from any of the units. Where a number of conduction paths between adjacent elements are selected as inhibitory, the performance of the net is varied significantly. For example, the net may be connected such that the arrows indicate excitatory inputs and the arrows with a crossline as inhibitory. In such a case, the number of possible paths is greatly reduced and the element Y will not respond to a simple signal input to element X alone but only when a pattern of simultaneous or near simultaneous signals arrive from a number of input elements 10. Thus, the device becomes a pattern recognition system. In the illustration given, paths A, C and D are inoperative and path B is operative when there is an input to $X_0$ and no input to $X_1$, or there is an input to $X_2$ and no input to $X_1$, or there is an input to all three. Path B will not be operative if there is an input to $X_1$ only, or to $X_1$ and either of $X_0$ or $X_2$ but not both. As the net becomes more complex and the effects of P-R inputs are considered, the information handling capacity increases astronomically. Regardless of the complexity, the net exhibits adaptive properties where the bus 24 is connected in common to all elements as illustrated by the dash lines of FIG. 2. The operation of the P-R switch affects only the elements which have recently been active to change the response of the net in the desired manner.

In all of the descriptions of this invention, the terms excitatory and inhibitory signals denote the effect upon succeeding or controlled elements and not the particular polarity of form of signal. It is recognized that the same signal can be used to enable or disable a conduction or switching device depending upon its mode of application. Therefore, inverting amplifiers or other signal processors can be selectively used to convert the same signal to opposite form and opposite function without departing from the concept of this invention.

Consider a network of elements 10 connected together in some fashion. Some of the connections will be excitatory and some inhibitory. Some of the elements 10 will be designated as inputs, and some outputs. Now let a stimulus be applied to the net. Some response will occur, and let us assume that it is a desirable response. Then the trainer will reward the net by momentary operation of the reward switch 24. This will lower the thresholds of those elements 10 which took part in the response, and will make it easier for them to respond in the same way to similar inputs.

On the other hand, if the response was not the desired one, the trainer will punish the net by momentary operation of swtch 24 to the punishment position, raising the thresholds of the responding units, and making it more difficult for them to respond a second time. Punishment will have an additional effect, however. Some of the responding elements will have been inhibiting other members of the net. When the inhibition sources are turned off, these newly-freed elements of the net may respond. Hence, punishment has the effect of making the net try new solutions to the same problem. It will therefore search for a response which is acceptable to the trainer, never retracing its path in solution space. This is what we mean by learned behavior.

As described above in FIG. 1, the computer element is made up of a number of recognized electronic circuits of known design. In the production of neural nets of meaningful compactness to information handling capacity, microcircuit techniques are highly advantageous. In particular, an entire neural net may be constructed as a single integrated circuit to achieve volumetric efficiency. For purposes of illustration, the principles of this invention may be reproduced using conventional discrete element circuitry in which case typical components and values may be:

| | |
|---|---|
| Input resistors **11** | 10K ohms. |
| Univibrator **14** | Unijunction transistor 2N1671A balanced circuit with 2N1308 driver stage. |
| Short term memory **20** | 2N1309NPN transistor phase splitter. |
| Bi-directional AND gate **21** | Diode bridge. |
| Controllable threshold resistor | Solion cell. Texas Res. & Elec. Corp. SE-110. |

Figure 4:
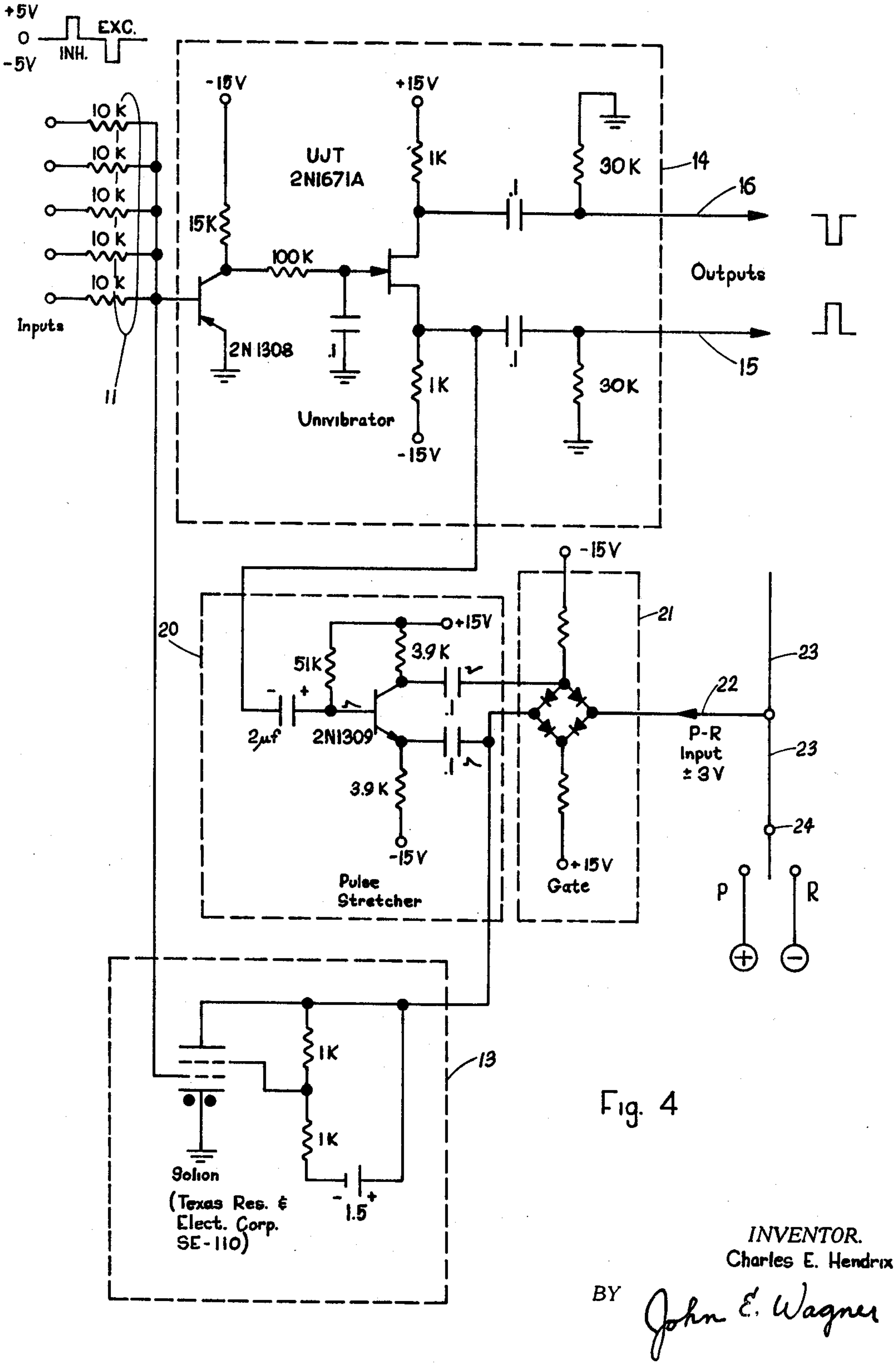

The above specific implementation is illustrated in FIG. 4. Obvious substitution for the configuration of the particular univibrator, short-term memory and AND gate will be apparent to those skilled in the art. The controllable threshold resistor 13, however, requires that the device be variable in resistance (electrically preferably) reversible and stable. Without resort to electromechanical devices which are impractical in complex nets, the solion cell is considered preferred. Also suitable is the ferroelectric field effect device described by P. M. Heymann et al. in vol. 54 of the Proceedings of the IEEE, pages 842–848 (June 1966).

The foregoing is a description of one or more embodiments of my invention. It is recognized that one skilled in the art can devise variations from the specific forms in which my invention is illustrated. In accordance with the patent laws of the United States, the rights granted thereunder are not limited to the specific embodiments illustrated, but rather by the scope of the following claims and their equivalents.

What is claimed is:

1. An artificial neuron comprising a circuit including:
   a plurality of inputs;
   means for summing said inputs;
   means responsive to summed inputs above a threshold for producing a signal;
   means for storing the signal from said signal producing means;
   an external control signal source; and,
   gate means for passing the signals from said storing means and said external source to control said threshold means.

2. The combination in accordance with claim 1, wherein said external source is capable of producing two discrete signals representative of a favored and of an unfavored response.

3. The combination in accordance with claim 2, wherein said threshold means responds to one of said discrete signals from said gate means to increase the threshold of said signal producing means and to the second of said discrete signals from said gate means to lower the threshold of said signal producing means.

References Cited

UNITED STATES PATENTS

| | | | |
|---|---|---|---|
| 3,097,349 | 7/1963 | Putzrath et al. | 340—172.5 |
| 3,106,699 | 10/1963 | Kamentsky | 340—172.5 |
| 3,165,644 | 1/1965 | Clapper | 307—201 |
| 3,196,415 | 7/1965 | Brain | 340—172.5 X |
| 3,229,115 | 1/1966 | Amarel | 307—88.5 |
| 3,310,784 | 3/1967 | Hilinski | 340—172.5 |
| 3,319,229 | 5/1967 | Fuhr et al. | 340—172.5 |
| 3,394,266 | 7/1968 | Martin et al. | 307—201 |

OTHER REFERENCES

Coates et al., "Design of a Solid-State Neuron Circuit for Use in Self-Organizing Systems," 1960 International Solid-State Circuits Conference, Digest of Technical Papers, pp. 39, 40.

Moraff, "Artificial Neurons," Electronics Industries, December 1963, pp. 52–56.

PAUL J. HENON, Primary Examiner

R. F. CHAPURAN, Assistant Examiner

U.S. Cl. X.R.

340—172.5